(12) United States Patent
Garbe et al.

(10) Patent No.: US 6,316,149 B1
(45) Date of Patent: *Nov. 13, 2001

(54) SOLID POLYMER ELECTROLYTE COMPOSITIONS

(75) Inventors: James E. Garbe, Stillwater; Radoslav Atanasoski, Edina; Steven J. Hamrock; Dinh Ba Le, both of St. Paul, all of MN (US)

(73) Assignees: Minnesota Mining and Manufacturing, St. Paul, MN (US); Hydro-Quebec Corporation, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,241

(22) Filed: Aug. 6, 1998

(51) Int. Cl.[7] ........................................... H01M 6/18
(52) U.S. Cl. ..................... 429/304; 429/188; 429/325; 429/306; 429/321; 429/313
(58) Field of Search ..................... 429/188, 304, 429/320, 325, 248, 252, 306, 313, 321

(56) References Cited

U.S. PATENT DOCUMENTS

| | | | |
|---|---|---|---|
| 3,940,667 | 2/1976 | Pearce | 317/230 |
| 4,303,748 | 12/1981 | Armand et al. | 429/192 |
| 4,357,401 | 11/1982 | Andre et al. | 429/192 |

(List continued on next page.)

FOREIGN PATENT DOCUMENTS

| | | |
|---|---|---|
| 0 580 865 A1 | 2/1994 | (EP) . |
| 0 666 607 A1 | 8/1995 | (EP) . |
| 04 245170 | 1/1991 | (JP) . |
| 245170 | 9/1992 | (JP) . |
| 5 303980 | 11/1993 | (JP) . |
| 6 279610 | 10/1994 | (JP) . |
| 7 82450 | 3/1995 | (JP) . |
| 08 064028 | 3/1996 | (JP) . |
| WO 93/045507 | 3/1993 | (WO) . |
| WO 98/593388 | 12/1998 | (WO) . |
| WO 98/59388 | * 12/1998 | (WO) ........................... H01M/10/40 |

OTHER PUBLICATIONS

Morrison and Boyd, "Reactions of Ethers", "Reactions of Aldehydes and Ketones", Organic Chemistry, Third Ed., pp. 559–561, 630–634, 1973.*

Borghini et al., "Electrochemical Properties of Polyethylene Oxide–Li [($CF_3SO_2)_2N$] –Gamma–$LiAlO_2$ Composite Polymer Electrolytes", J. Electrochem. Soc., 142(7):2118–2121 (1995).

Appetecchi et al., "Kinetics and Stability of the Lithium Electrode in Poly(Methylmethacrylate)–Based Gel Electrolytes", Electrochimica Acta, 40(8):991–997 (1995).

Eichinger et al., "Properties and potential application of silica–gelled electrolytes for lithium–ion batteries", J. of Power Sources, 68:387–391 (1997).

Fan et al., "Composite Electrolytes Prepared from Fumed Silica, Polyethylene Oxide Oligomers, and Lithium Salts", J. Electrochem. Soc., 144(2):399–408 (1997).

Gores et al., "Nonaqueous electrolyte solutions: New materials for devices and processes based on recent applied research", Pure & Appl. Chem., 67(6):919–930 (1995).

(List continued on next page.)

Primary Examiner—Gabrielle Brouillette
Assistant Examiner—Angela J. Martin
(74) Attorney, Agent, or Firm—Mueting, Raasch and Gebhardt, P.A.

(57) ABSTRACT

An electrolyte composition is featured that includes a solid, ionically conductive polymer, organically modified oxide particles that include organic groups covalently bonded to the oxide particles, and an alkali metal salt. The electrolyte composition is free of lithiated zeolite. The invention also features cells that incorporate the electrolyte composition.

24 Claims, 5 Drawing Sheets

U.S. PATENT DOCUMENTS

| | | | |
|---|---|---|---|
| 4,578,326 | 3/1986 | Armand et al. | 429/192 |
| 5,141,827 | 8/1992 | Fritz et al. | 429/191 |
| 5,194,341 | 3/1993 | Bagley et al. | 429/189 |
| 5,360,686 | 11/1994 | Peled et al. | 429/191 |
| 5,472,808 * | 12/1995 | Peled et al. | 429/192 |
| 5,486,435 | 1/1996 | Brochu et al. . | |
| 5,494,949 | 2/1996 | Kinkel et al. . | |
| 5,521,026 | 5/1996 | Brochu et al. | 429/192 |
| 5,523,181 | 6/1996 | Stonehart et al. | 429/192 |
| 5,529,707 | 6/1996 | Kejha . | |
| 5,599,355 | 2/1997 | Nagasubramanian et al. | 29/623.5 |
| 5,622,792 | 4/1997 | Brochu et al. . | |
| 5,728,489 | 3/1998 | Gao et al. . | |
| 5,965,299 * | 10/1999 | Khan et al. | 429/313 |
| 6,015,638 * | 1/2000 | Ventura et al. | 429/307 |

OTHER PUBLICATIONS

Khan et al.,"Composite Polymer Electrolytes Using Fumed Silica Fillers: Rheology and Ionic Conductivity", *Chem. Matter*, 6:2359–2363 (1994).

Khan et al., "Dynamic Rheological Behavior of Flocculated Fumed Silica Suspensions", *J. Rheol.*, 37(6):1225–1235 (1993).

Fan et al., "Composite polymer electrolytes using surface–modified fumed silicas: conductivity and rheology," *Solid State Ionics*, 111:117–123 (1998).

* cited by examiner

SOLID POLYMER ELECTROLYTE COMPOSITIONS

STATEMENT AS TO FEDERALLY SPONSORED RESEARCH

The government of the United States of America has rights in this invention pursuant to Cooperative Agreement No. DE-FC02-91CE50336 awarded by the United States Department of Energy.

BACKGROUND OF THE INVENTION

The invention relates to preparing compositions useful as electrolytes for alkali metal polymer batteries and the electrochemical cells and batteries made with such electrolytes.

Alkali metal polymer batteries generally include a positive electrode, a negative electrode, and an electrolyte positioned between the electrodes. The electrolyte can act to separate the electrodes and, because it is ionically conductive, provides a path through which ions flow from one electrode to the other during charging and discharging of the cell. Electrolytes can be solid or liquid. Liquid electrolytes include aqueous and nonaqueous solutions and molten salts. Solid electrolytes include ionically conducting polymers. Electrolytes can include salts, and liquids or polymers or combinations thereof capable of solvating the salt.

Lithium polymer batteries that include a lithium metal negative electrode, a metal oxide positive electrode and a solid electrolyte offer the advantage of high energy storage capacity and rechargeability. To optimize the cycle number or cycle life of a battery or cell, it is desirable to minimize or eliminate the growth of dendrites. Dendrite growth can result from the nonuniform plating of lithium onto the negative electrode during the charging step. Dendrites can puncture the electrolyte and make contact with the opposite electrode, thus causing an internal short circuit in the cell, which can compromise cell performance and shorten its useful life.

SUMMARY OF THE INVENTION

In one aspect, the invention features an electrolyte composition that includes a solid, ionically conductive polymer, organically modified oxide particles that include organic groups covalently bonded to the oxide particle, and an alkali metal salt. The electrolyte composition is essentially free of lithiated zeolite. In preferred embodiments, the organically modified oxide particles are essentially free of organic groups capable of ionically interacting with the alkali metal salt. The organically modified oxide particles preferably are essentially free of organic groups that include hydrogen atoms capable of forming hydrogen bonds.

Useful oxide particles are selected from the group consisting of silica, alumina, titania, zirconia, and combinations thereof. In one preferred embodiment, the oxide particles include silica. In some embodiments, the organic groups are selected from the group consisting of alkyl, alkene, alkyne, aryl, aldehyde, ketone, ester tertiary amide, ethers, and halogenated derivatives thereof, siloxanes, or combinations thereof.

In other embodiments, the electrolyte includes at least about 1% by volume organically modified oxide particles.

In preferred embodiments, the alkali-metal salt includes a lithium salt selected from the group consisting of lithium hexafluorophosphate, lithium trifluoromethane sulfonate, lithium bis(trifluoromethylsulfonyl)imide, and combinations thereof.

In one embodiment, the solid polymer includes a polyalkylene oxide, e.g., polyethylene oxide, having a molecular weight greater than about 100,000. In other embodiments, the solid polymer includes a copolymer that includes the reaction product of monomers selected from the group consisting of ethylene oxide, propylene oxide, allyl glycidyl ether, and combinations thereof.

In some embodiments, the electrolyte may include a low-melting oxygenated organic compound selected from the group consisting of cyclic carbonate (e.g., ethylene carbonate), dialkyl carbonate, ether, polyether, and combinations thereof.

In one embodiment, the electrolyte is a pressure sensitive adhesive.

In another embodiment, when the above-described electrolyte composition is incorporated into a cell, the cell is characterized by a voltage variation of no greater than ±3 mV over a period of five charge-discharge cycles, where each half cycle consists of about 1 mAh/cm$^2$ lithium being transferred through the electrolyte at a cycling rate of 0.5 mA/cm$^2$.

In other aspects, the invention provides a cell that includes a first electrode, a second electrode, and the above-described electrolyte composition. In one embodiment, the cell includes a first electrode, a second electrode, and the above-described electrolyte composition adhered to a major surface of at least one of the electrodes. The cell is characterized by a voltage variation of no greater than about ±3 mV over a period of five charge-discharge cycles, where each half cycle consists of about 1 mAh/cm$^2$ lithium being transferred through the electrolyte at a cycling rate of 0.5 mA/cm$^2$.

In another aspect, the invention features a composite electrode that includes the above-described electrolyte composition.

Electrolyte compositions of the invention have adhesive properties (preferably, pressure sensitive adhesive properties) and are capable of being adhered to electrodes. When laminated to the electrode, the electrolyte maintains direct contact with the electrode, which facilitates ionic transfer between electrodes and uniform deposition of the electrode metal (e.g., lithium) on the surface of the electrode during charge-discharge cycling.

Electrochemical cells and batteries constructed from the electrolyte compositions of the invention exhibit uniform plating of electrode materials, impedance levels similar to the impedance of the solid, ionically conductive polymer, and the ability to cycle repeatedly at constant cell voltage levels. The electrolyte compositions also exhibit unexpectedly stable levels of impedance (i.e., the internal impedance of the cell does not increase significantly) during cell cycling and are capable of cycling for greater than 50 cycles in a lithium-lithium cell, at four hours/cycle, with a current density 0.5 mA/cm$^2$, at a depth of discharge of 1 mAh/cm$^2$, and at 80° C. In addition, the electrolyte compositions possess sufficient ionic conductivity at room-temperature such that batteries that include the electrolyte compositions can be discharged at low current densities at these temperatures.

The organically modified particles provide improved structural integrity to the electrolyte compositions, which allows batteries and cells to be constructed from thin (i.e., less than about 20 µm) electrolyte films. The strengthened electrolyte also is relatively less penetrable by dendrites compared to solid polymer electrolytes that do not include organically modified oxide particles. Consequently, electrochemical cells with long cycle life can be achieved. The stronger electrolyte films also exhibit improved web handling at higher speeds compared to electrolyte films constructed solely of the solid, ionically conductive polymer. In addition, the electrolyte compositions of the invention are less combustible than solid polymer electrolytes due to the incorporation of non-combustible inorganic fillers.

Composite anodes and composite cathodes that include the electrolyte composition also exhibit the above-described properties.

The material costs associated with primary and secondary batteries are lowered due to decreased use of the relatively more expensive conductive polymer that has been reinforced with the less expensive organically modified oxide particles. Processing steps previously required to strengthen the component layers (e.g., chemical crosslinking of polymers) can be eliminated, thereby lowering the costs associated with battery manufacture without reducing performance.

Other features and advantages of the invention will be apparent from the following description of the preferred embodiments thereof, and from the claims.

DESCRIPTION OF THE PREFERRED EMBODIMENTS

The invention features electrolyte compositions that include a solid ionically conductive polymer, organically modified oxide particles, and an alkali metal salt.

Useful solid, ionically conductive polymers are capable of conducting ions at room temperature. Useful solid, ionically conductive polymers are capable of dissolving alkali metal salts. Preferred solid polymers have a molecular weight greater than about 50,000, more preferably greater than about 100,000. Examples of suitable solid ionically conductive polymers include: polyethers of the general formula $$(CH_2CH_2O)_x(CH_2CHRO)_y,$$

where x and y are mole fractions between zero and 1, x+y=1, and

R is a straight-chain or branched alkyl group having the formula $$C_nH_{2n+1},$$

where n is 1 to 12, a straight chain or branched arylalkyl group having the formula $$ArC_nH_{2n'},$$

where n' is 1 to 12, and

Ar is an aromatic moiety (e.g., phenyl and naphthyl), an ethylenically unsaturated group having the formula $$CHR'=C(R')ZC_{n''}H_{2n''},$$

where R' is H or methyl,

Z, if present, is O, S, SO, $SO_2$, NH, CO, or $CO_2$ and n" is 0 to 12, an oligoether of the general formula

$$R'(CHR'CH_2O)_n,$$

where R' and n are as defined above.

Other useful solid ionically conductive polymers include poly(siloxanes) of the general formula poly(phosphazenes) of the general formula and poly(acrylates) of the general formula where x, y, R and R' are as defined above, R" is a hydrocarbon linking group having the formula $C_nH_{2n}$, where n is as described above, z is greater than one and is selected to provide a polymer with a molecular weight of at least 50,000, preferably at least 100,000, and Q is an oligoether of the general formula $$R(CH_2CHR'O)_n,$$

where R, R' and n are as defined above.

Useful solid ionically conductive polymers include copolymers prepared from the reaction product of monomers such as, e.g., ethylene oxide, chemically substituted oxiranes, e.g., polypropylene oxide, allyglycidyl ether, and 2-butene oxide. Preferably the ionically conductive polymer is a polyalkylene oxide, more preferably polyethylene oxide. Useful particles include oxides of silicon, aluminum, titanium, zirconium, magnesium, calcium, barium, strontium, and combinations thereof. Preferred oxide particles include oxides of silicon (e.g., silica), aluminum (e.g., alumina), titanium (e.g., titania), zirconium (e.g., zirconia), and combinations thereof. Preferred oxide particles have a surface area between about 2 m²/ml (meter²/milliliter) and 2000 m²/ml, more preferably about 100 m²/ml to about 1200 m²/ml.

The oxide particles are organically modified. Preferred oxide particles include organically modified silica. The oxide particles can be organically modified by reacting the oxide particle with suitable organic compounds that bear functional groups that can react with the surface of the oxide particles. The organic compounds can be coupled, or covalently bonded to the surface of the oxide particles. The organically modified surface of the particles include non-ionic, non-hydrogen bond donating organic groups such as, e.g., alkyl (e.g., octyl and methyl), alkene, alkyne, aryl, aldehyde, ketone, ester tertiary amide, ethers, and halogenated derivatives thereof, siloxanes, and combinations thereof.

Organic surface modifying agents are commercially available from Gelest Inc., Tullytown, Pa., PCR Inc., Gainsville, Fla. and United Chemical Technologies Inc., Bristol, Pa. Useful organically modified silicas are commercially available from Cabot Corp., Tuscola, Ill., DeGussa Corp., Schaumburg, Ill., Nalco Chemical Co., Naperville, Ill., and Nisson Chemical Co., Tarrytown, N.Y.

The organic groups can prevent contact between the ionically conductive polymer and the oxide component of the particle, which prevents the polymer from adsorbing onto the particle. The organic groups may shield the oxide component of the particle from cations present in the electrolyte and prevent cations from adsorbing onto the particle. Preferred organic groups are essentially free of hydrogen atoms capable of forming hydrogen bonds and essentially free of groups capable of ionically interacting with the cations of the alkali metal salt. Preferably the organically modified oxide particles maintain the conductivity and adhesive properties of the ionically conductive polymer.

The organically modified surface of the particles can include organic reactive groups (i.e. functional groups capable of reacting with other like groups or with different functional groups to form one or more covalent bonds). The polymer can also include organic reactive groups. The organic groups on the particles and the polymers can react with each other to form bonds, e.g., particle to particle bonding, particle to polymer bonding, and polymer to polymer bonding.

Organic moieties bearing reactive groups can be attached to the particles by the reaction of the hydroxyl groups on the particle surface and the functional groups on the organic moiety.

Examples of groups capable of reacting with identical or similar groups and capable of associating with the particles, polymer or a combination thereof, include olefinically unsaturated moieties such as, e.g., styryl, allyl, vinyl, acrylate esters, methacrylate esters, vinyl ethers, and allyl ethers, having the general structure where Z, if present, is a linking group, e.g., NH, O, S, $SO_2$, SO, $CH_2$, CO, or $CO_2$, and R is H, a branched or straight-chain alkyl of the general formula $C_nH_{2n}$ where n is as described above, phenyl, naphthyl or other aromatic group, and Q is the polymer chain or particle linking functional group.

The organically modified oxide particles are present in an amount that will maintain the ability of the electrolyte composition to adhere to the surface of an electrode. Useful electrolyte compositions include at least about 1% by volume (preferably between about 1 and 30% by volume, more preferably from about 1 to about 17.5% by volume, most preferably about 1 to about 15% by volume) based upon the total volume of the electrolyte composition. Preferred alkali metal salts are highly disassociated in solution and the cation is complexed by the oxygen atoms in the polymer electrolyte mixture. Preferred alkali metal salts have the formula MX, where M is a positively charged ion of a Group IA element such as, e.g., lithium, sodium or potassium, and X is a negatively charged ion including, e.g., $S^{2-}$, $N^{3-}$, a negatively charged ion of a Group VIIB element such as e.g., $I^-$, $Br^-$, or $Cl^-$, an ion of a polyatomic species such as $CF_3SO_3^-$, and $(CF_3SO_2)_2N^-$, and combinations thereof. Examples of useful highly soluble and disassociated alkali metal salts include, lithium hexafluorophosphate, lithium trifluoromethane sulfonate, lithium bis(trifluoromethylsulfonyl) imide, and combinations thereof. The electrolyte composition includes sufficient alkali metal salt to provide an electrolyte composition in which the atomic ratio of oxygen atoms to lithium atoms is between about 10:1 and about 40:1, more preferably between about 25:1 and about 35:1.

The electrolyte composition can also include low molecular weight, oxygen-containing organic compounds such as, e.g., ethers, carbonic acid esters, sulfones, and combinations thereof. Preferred organic compounds have melting points below about 80° C., preferably below about 20° C. Suitable organic compounds are chosen to form ionically conductive solutions of highly disassociated alkali metal salts as set forth above. Useful organic compounds include cyclic esters of carbonic acid (e.g., ethylene carbonate and propylene carbonate), symmetrical and unsymmetrical dialkyl esters of carbonic acid (e.g., diethyl carbonate, ethyl methyl carbonate), cyclic ethers (e.g., tetrahydrofuran, 2-methyltetrahydrofuran, 1,3-dioxolane), alicyclic ethers (e.g., ethylene glycol dimethyl ether, diglyme, and tetraglyme), cyclic sulfones (e.g., sulfolane), and symmetrical and unsymmetrical dialkyl sulfones (e.g., diethyl sulfone, ethyl methyl sulfone). The group of useful oxygen-containing organic compounds also includes compounds that contain more than one of these useful functional groups. Oxygen-containing organic compounds can be added to the electrolyte composition to increase the room temperature conductivity of the electrolyte composition.

The electrolyte composition can also include a variety of other components including such additives as antioxidants, crosslinkers, initiators, and plasticizers.

The invention will now be described further by way of the following examples.

EXAMPLES

POLYMER SOLUTION PREPARATION

Polymer compositions were prepared as follows. 100 parts by weight of ethylene oxide/propylene oxide/allyl glycidyl ether copolymer (available from Dai-Ichi-Cogyo Seiyaku, Japan) was dissolved in 150 parts by weight of 4:1 volume:volume acetonitrile:toluene. 21.7 parts by weight lithium bistrifluoromethylsulfonimide and 1 part by weight Irgacure 651 photoinitiator (available from Ciba-Geigy) were added sequentially, with stirring after each addition, until the solids were dissolved to form a polymer solution.

SILICA PREPARATION

All silica used was predried under vacuum overnight at 110–140EC.

Silica Preparation 1

7 parts by weight Aerosil A130 hydrophilic silica (commercially available from Degussa Corporation) was combined with about 10 parts by weight of 4:1 acetonitrile:toluene in a 1000 ml polyethylene jar. The jar was filled about halfway with ceramic milling beads 1 cm in diameter, capped, and tightly sealed. The jar was rolled on a conventional roller mill for about 48 hours.

Silica Preparation 2

7 parts by weight Aerosil A130 hydrophilic silica (commercially available from Degussa Corporation) was combined with 1 part by weight dried FC405 (a 50% solution of a perfluorsulfonamidosilane in methanol) to form a surface modified hydrophobic fumed silica bearing perfluoroalkyl surface groups.

Silica Preparation 3

1 part by weight Aerosil R972 methyl modified fumed silica (Degussa) was combined with about 10 parts by weight of 4:1 acetonitrile:toluene in a 1000 ml polyethylene jar. The jar was filled about halfway with ceramic milling beads 1 cm in diameter, capped, and tightly sealed. The jar was rolled on a conventional roller mill for about 48 hours.

Silica Preparation 4

1 parts by weight Aerosil RP711 methacrylate modified hydrophobic fumed silica (Degussa) were combined with about 10 parts by weight of 4:1 acetonitrile:toluene in a 500 ml polyethylene jar. The jar was filled about halfway with ceramic milling beads 1 cm in diameter, capped, and tightly sealed. The mixture was then milled according to the method of Silica Preparation 1.

Silica Preparation 5

1 part by weight perfluoroalkyl modified hydrophobic fumed silica prepared according to the method of Silica Preparation 2 was combined with 10 parts by weight of 4:1 acetonitrile:toluene in a 500 ml polyethylene jar. The jar was filled about halfway with ceramic milling beads 1 cm in diameter, capped, and tightly sealed. The mixture was then milled according to the method of Silica Preparation 1.

Silica Preparation 6

1 part by weight Aerosil R805 octyl modified fumed silica (Degussa) was combined with about 10 parts by weight of 4:1 acetonitrile:toluene in a 1000 ml polyethylene jar. The jar was filled about halfway with ceramic milling beads 1 cm in diameter, capped, and tightly sealed. The jar was rolled on a conventional roller mill for about 48 hours.

ELECTROLYTE PREPARATION

Comparative Example 1

An aliquot of the polymer solution described above was coated in a thin layer (to provide a layer of about 14 um after drying) onto a polypropylene film backing using a conventional knife coater, and then dried at 80° C. to form a solid polymer electrolyte film. Immediately after drying, the resulting film was passed through a chamber to expose the dry coat to a ultraviolet light source to crosslink the polymer. The film was then stored until used in an electrochemical cell.

Comparative Example 2

1 part by weight of the hydrophilic silica mixture prepared according to Silica Preparation 1, and 4 parts by weight solids (polymer/salt/Irgacure) of the polymer solution prepared as described above, were combined in a 500 ml wide-mouth poly(ethylene) jar. The jar was filled halfway with ceramic milling beads 1 cm in diameter, capped, and then tightly sealed. The jar was rolled on a conventional roller mill for 5 days to form a suspension.

The suspension was coated in a thin layer (to provide a layer of about 14 um after drying) onto a polypropylene film backing using a conventional knife coater, and then dried at 80° C. to form a solid polymer electrolyte film. Immediately after drying, the resulting film was passed through a chamber to expose the dry coat to a ultraviolet light source to crosslink the polymer. The film was then stored until used in an electrochemical cell.

Example 1

An electrolyte was prepared according to the procedure described above in Comparative Example 2 with the exception that the silica used was that of Silica Preparation 2 instead of Silica Preparation 1.

Example 2

An electrolyte was prepared according to the procedure described above in Example 1 with the exception that the silica used was that of Silica Preparation 3 instead of Silica Preparation 2.

Example 3

An electrolyte was prepared according to the procedure described above in Example 1 with the exception that the silica used was that of Silica Preparation 4 instead of Silica Preparation 2.

Example 4

An electrolyte was prepared according to the procedure described above in Example 1 with the exception that the silica used was that of Silica Preparation 5 instead of Silica Preparation 2.

Example 5

An electrolyte was prepared according to the procedure described above in Example 1 with the exception that the silica used was that of Silica Preparation 6 instead of Silica Preparation 2.

ELECTROCHEMICAL CELL PREPARATION

Comparative Example 3

A circular electrolyte measuring 1 in. in diameter was die cut from the solid polymer electrolyte film of Comparative Example 1, peeled from the polypropylene backing, and placed between two circular die cut pieces of lithium foil having a nickel backing and measuring 1 in. in diameter. The structure was heat sealed between two brass shims using an appropriate hot melt adhesive. The sealing process provides the air tightness as well as the electric contacts necessary for the electrochemical evolution.

Figure 1:
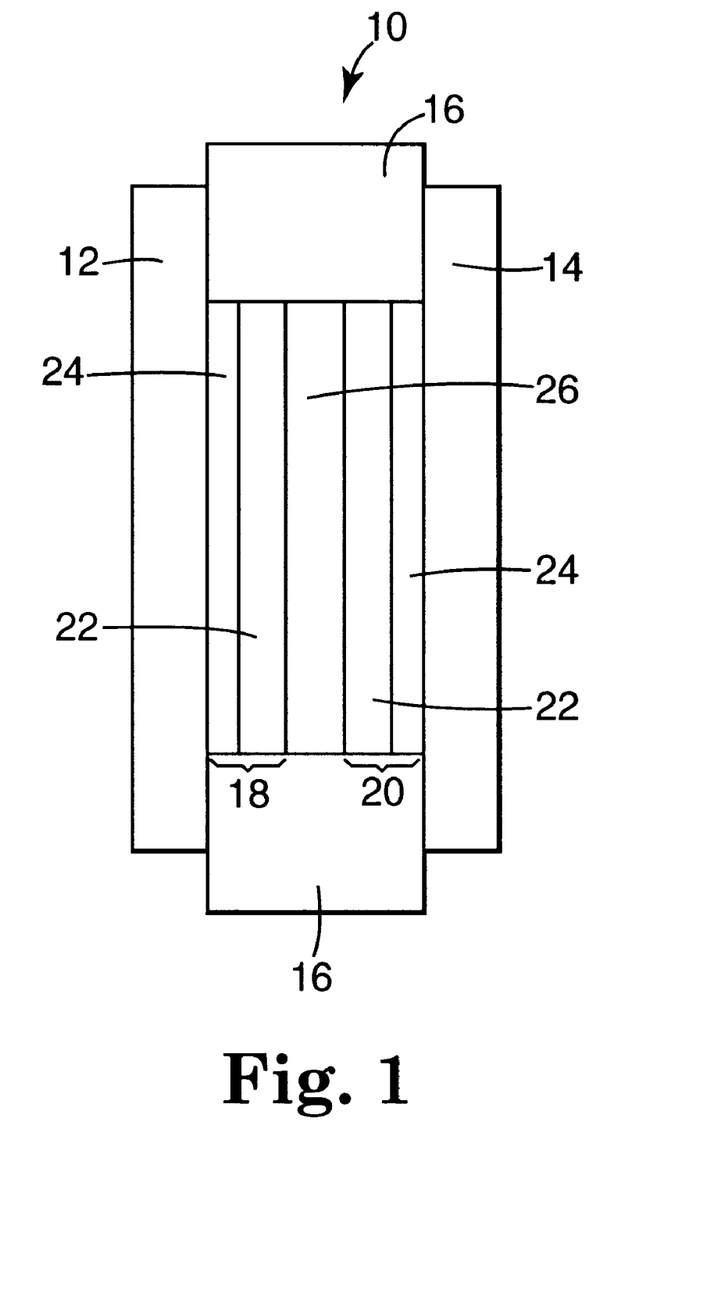
FIG. 1 is a schematic view of cross-section of an electrochemical cell used to test various electrode compositions.

A view taken in cross-section of the electrochemical cell 10 is shown in FIG. 1. Cell 10 includes two brass shims 12, 14, which contain the cell. Brass shims 12, 14 are maintained in a fixed relation to each other by adhesive 16. Cell 10 also includes two electrodes 18, 20 each of which includes lithium foil 22 and a nickel backing 24. Electrodes 18, 20 are separated by solid polymer electrolyte composition 26.

Comparative Examples 4–6

Comparative Examples 4–6 were electrochemical cells prepared following the procedure of Comparative Example 3 with the exception that the solid polymer electrolyte film prepared according to Comparative Example 2 was used as the solid polymer electrolyte composition of each of Comparative Examples 4–6.

Examples 6–10

Examples 6–10 were electrochemical cells prepared as in Comparative Example 3 with the exception that the solid polymer electrolyte films prepared according to Examples 1–5 were used as the solid polymer electrolyte composition of Examples 6–10 respectively.

ELECTROCHEMICAL CELL TEST PROCEDURE

Electrochemical cells prepared as described above in the Electrochemical Cell Preparation Procedure were cycled through a period of 150 cycles or until the cell could no longer cycle. All electrochemical cell testing was done at 80° C. During the cycles lithium was repeatedly stripped and plated on each electrode by changing the polarity of the cycle over time increments that gradually increased but were no greater than about 2 hours. The cells were then cycled with a current density of about 0.5 mA/cm$^2$ (also known as the C/2 rate). The cell voltage was recorded at regular voltage and time increments. After 2 hours the current flow was interrupted and the cell polarity was reversed. Current flow was then resumed and cell voltage was again recorded.

Figure 2:
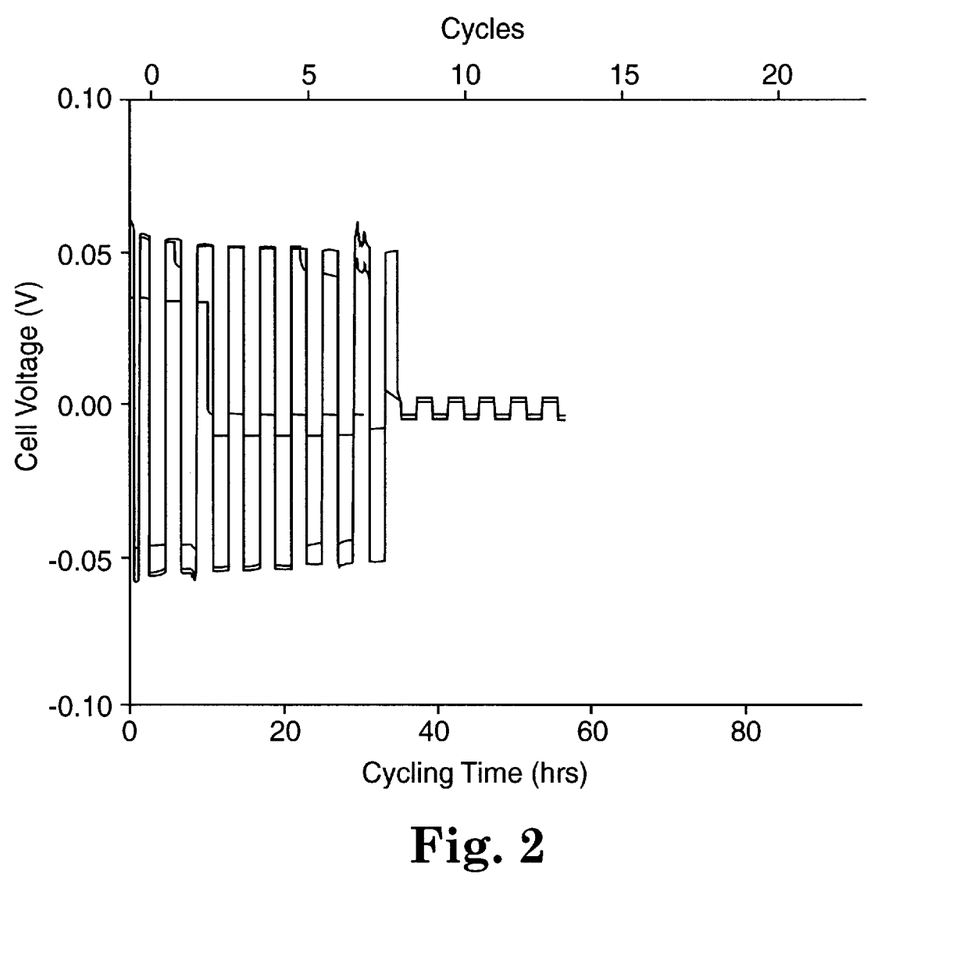
FIG. 2 is a series of plots of cell voltage vs. time for the cells of Comparative Examples 4–6.

FIG. 2 is a plot of cell voltage vs. time (hours) for three cells prepared and tested according to the procedures described above in Comparative Examples 4–6. The plots represent cell voltage at steady state. One of the cells of Comparative Examples 4–6 stopped functioning (i.e., failed to cycle) before 20 hours of cycling time had elapsed, and the other two cells stopped functioning before 40 hours of cycling time had elapsed.

Figure 3:
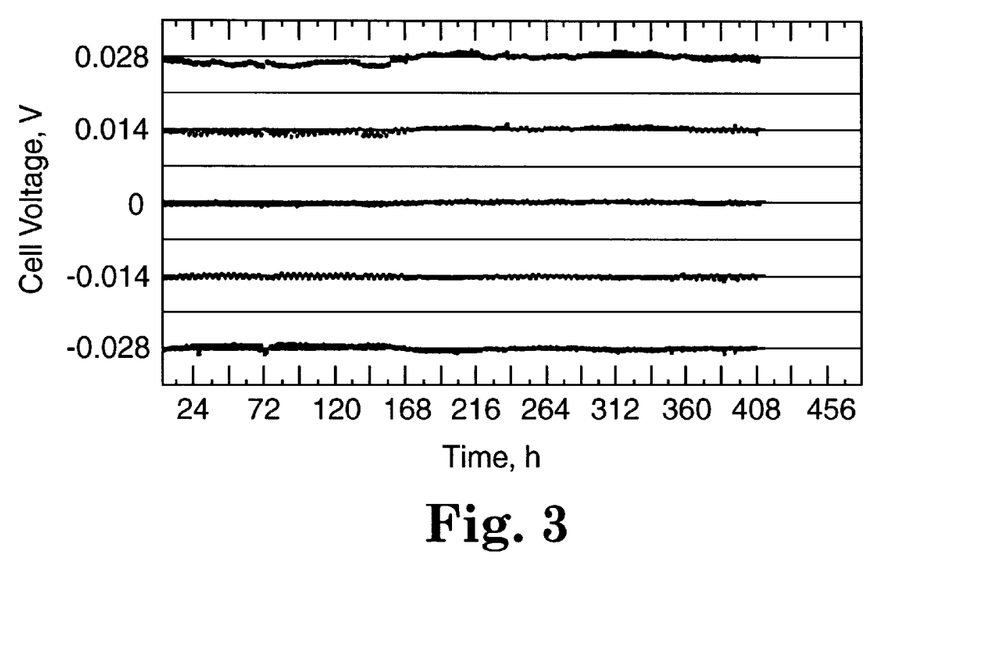
FIG. 3 is a plot of cell voltage vs. time for the cell of Example 10.

FIG. 3 is a plot of cell voltage during current flow vs. time (hours) for the cell of Example 10. The data at 0.028 and –0.028 V represent cell voltage at steady state. The data at 0V represent an open circuit with a two minute relaxation between cycles, and data at 0.014 and –0.014 represent cell voltage drop due predominantly to the ohmic component of cell impedance.

Figure 4:
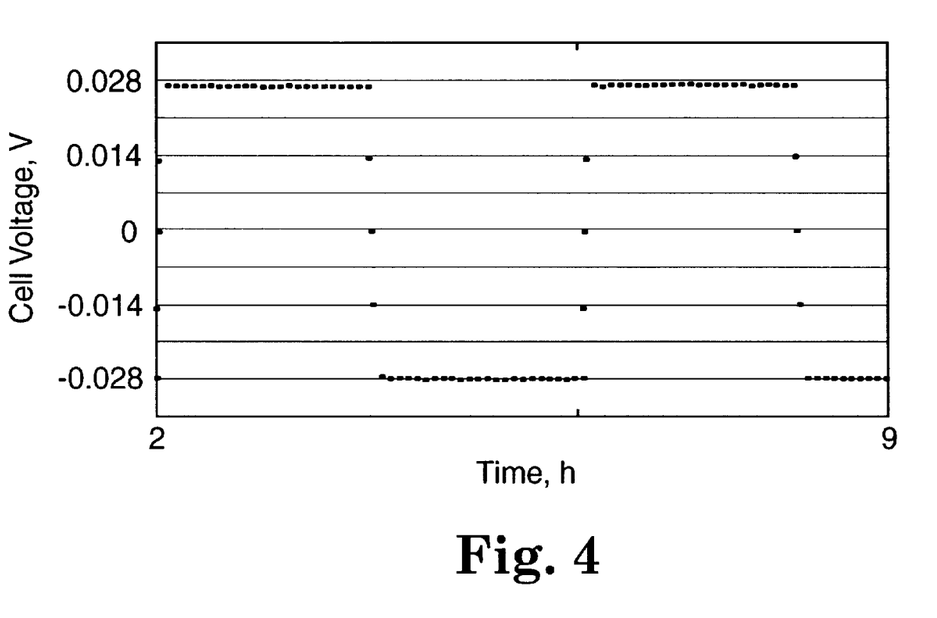
FIG. 4 is an expanded plot of cell voltage vs. time for the cell of Example 10.

FIG. 4 is an expanded plot of cell voltage during current flow vs. time for the cell of Example 10.

Figure 5:
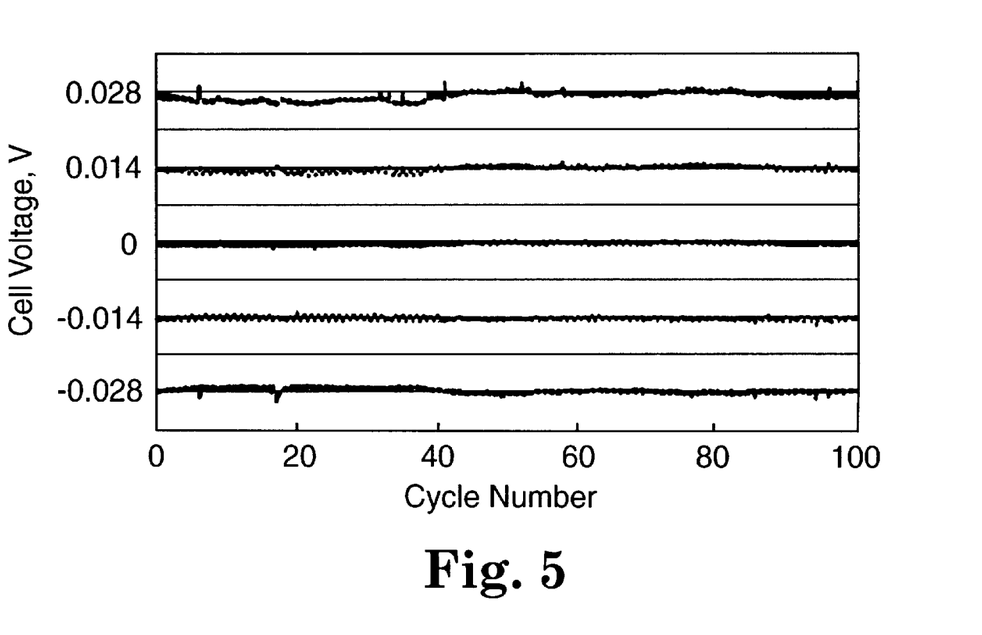
FIG. 5 is a plot of cell voltage vs. cycle number for the cell of Example 10.

FIG. 5 is a plot of cell voltage vs. cycle number for the cell of Example 10.

Figure 6:
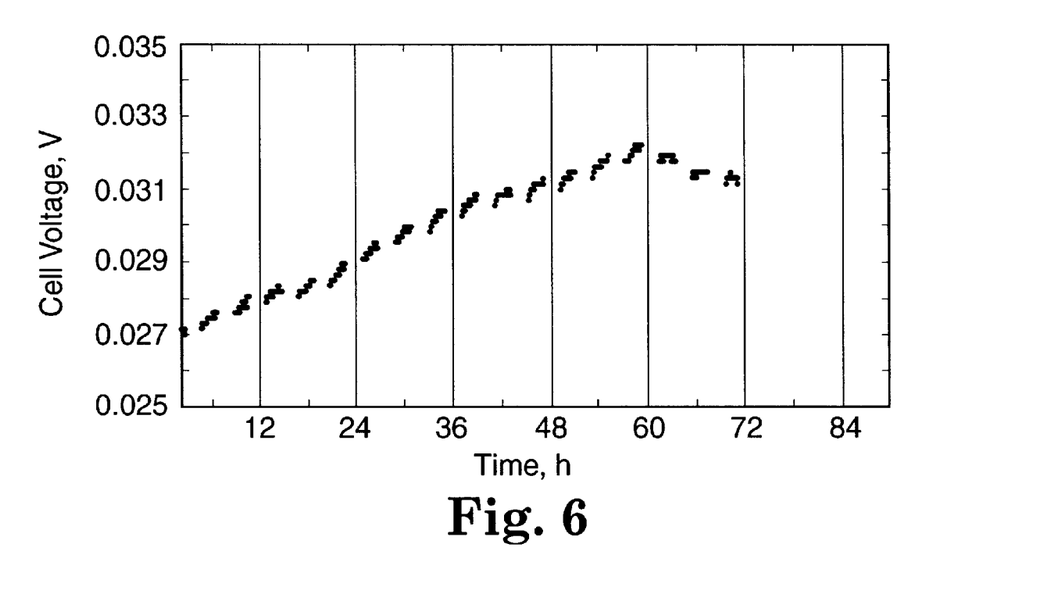
FIG. 6 is a plot of cell voltage at steady state vs. time for the cell of Comparative Example 3.

FIG. 6 is a plot of cell voltage vs. time for the cell of Comparative Example 3. The plot represents the cell voltage at steady state during positive current flow. The cell demonstrated an increasing impedance over time followed by a failure to cycle.

Figure 7:
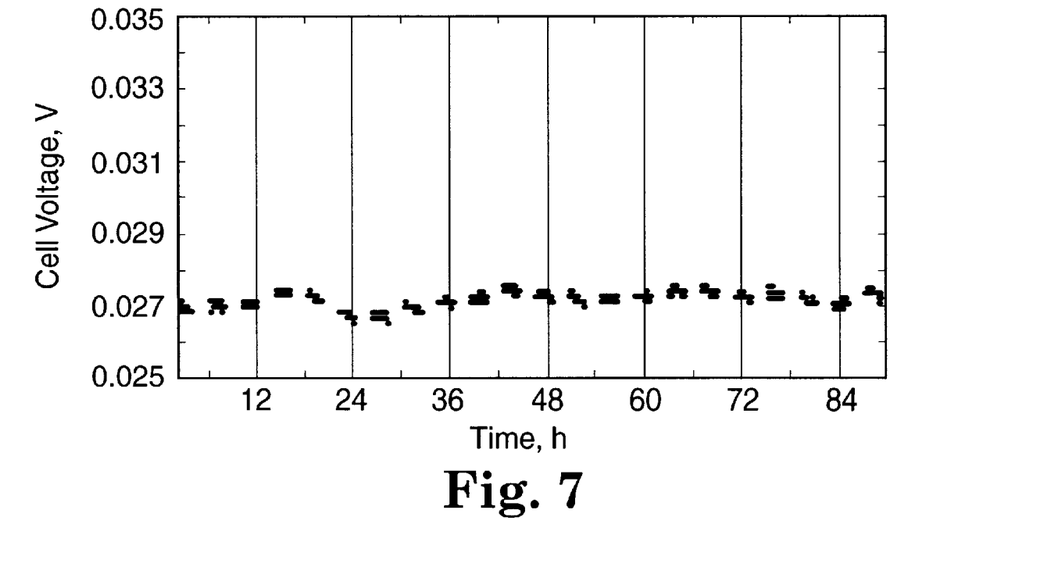
FIG. 7 is a plot of cell voltage at steady state vs. time for the cell of Example 10.

FIG. 7 is a plot of cell voltage vs. time for the cell of Example 10. The plot represents the cell voltage at steady state during positive current flow.

COMPOSITE ELECTRODE PREPARATION

Example 11

2% by weight of the Aerosil R972 methyl modified fumed silica mixture prepared according to Silica Preparation 3, 62% by weight vanadium oxide, 3% by weight carbon black, and 33% by weight solids (polymer/salt/Irgacure) of the polymer solution prepared as described above, were combined with 4:1 acetonitrile:toluene in a 500 ml wide-mouth poly(ethylene)jar. The jar was filled halfway with ceramic milling beads 1 cm in diameter, capped, and then tightly sealed. The jar was rolled on a conventional roller mill for approximately one week. The slurry was then coated on a current collector and dried to form an electrode.

It will be recognized that other embodiments are within the claims. For example, composite electrodes (e.g., anodes and cathodes) can include the electrolyte composition. The composite electrodes can also include other components such as, e.g., materials capable of incorporating alkali metal ions (e.g., lithium ions), electronically conducting materials, binders, and combinations thereof. Batteries, e.g., lithium batteries, can be formed using one or more electrodes that include the disclosed electrolyte composition.

What is claimed is:

1. A solid polymer electrolyte composition comprising:
   (a) a solid, ionically conductive polymer comprising a polyalkylene oxide having a molecular weight greater than about 100,000;
   (b) organically modified oxide particles comprising organic groups covalently bonded to said oxide particles; and
   (c) an alkali metal salt;
   said electrolyte composition being essentially free of lithiated zeolite; and
   said organically modified oxide particles being essentially free of covalently bonded organic groups capable of ionically interacting with said alkali metal salt, and essentially free of covalently bonded organic groups comprising hydrogen atoms capable of forming hydrogen bonds.

2. The electrolyte of claim 1 wherein said oxide particles are selected from the group consisting of alumina, titania, zirconia, and combinations thereof.

3. The electrolyte of claim 1 wherein said oxide particles comprise silica.

4. The electrolyte of claim 1 wherein said alkali-metal salt comprises a lithium salt selected from the group consisting of lithium hexafluorophosphate, lithium trifluoromethane sulfonate, lithium bis(trifluoromethylsulfonyl)imide, and combinations thereof.

5. The electrolyte of claim 1 wherein said polyalklene oxide is a polyethylene oxide.

6. The electrolyte of claim 1 wherein said solid polymer comprises a copolymer comprising the reaction product of monomers selected from the group consisting of propylene oxide, ethylene oxide, allyl glycidyl ether, and combinations thereof.

7. The electrolyte of claim 1 further comprising a compound selected from the group consisting of dialkyl carbonate, cyclic carbonate, ether, polyether, and combinations thereof.

8. The electrolyte of claim 7 wherein said cyclic carbonate comprises ethylene carbonate.

9. The electrolyte of claim 1 wherein said electrolyte is a pressure sensitive adhesive.

10. A solid polymer electrolyte composition comprising:
    (a) a solid, ionically conductive polymer comprising a polyalkylene oxide having a molecular weight greater than about 100,000;
    (b) organically modified oxide particles comprising organic groups covalently bonded to said oxide particles; and (c) an alkali metal salt;
   said organically modified oxide particles being essentially free of covalently bonded organic groups capable of ionically interacting with said alkali metal salt, and essentially free of covalently bonded organic groups comprising hydrogen atoms capable of forming hydrogen bonds; and
   when said electrolyte is incorporated into a cell, the cell exhibits a voltage variation of no greater than ±3 mV over a period of five charge-discharge cycles, where each half cycle consists of about 1 mAh/cm$^2$ lithium being transferred through said electrolyte at a cycling rate of 0.5 mA/cm$^2$ at 80° C.

11. The electrolyte of claim 10, wherein said electrolyte, when incorporated into a cell, is functional over a period of at least about 16 charge-discharge cycles, where each half cycle consists of about 1 mAh/cm$^2$ lithium being transferred through said electrolyte at a cycling rate of 0.5 mA/cm$^2$.

12. The electrolyte of claim 10, wherein said electrolyte, when incorporated into a cell, is functional over a period of at least about 25 charge-discharge cycles, where each half cycle consists of about 1 mAh/cm$^2$ lithium being transferred through said electrolyte at a cycling rate of 0.5 mA/cm$^2$.

13. The electrolyte of claim 10, wherein said electrolyte, when incorporated into a cell, is functional over a period of at least about 50 charge-discharge cycles, where each half cycle consists of about 1 mAh/cm$^2$ lithium being transferred through said electrolyte at a cycling rate of 0.5 mA/cm$^2$.

14. The electrolyte of claim 10, wherein said organically modified oxide particles comprise organically modified silica.

15. The electrolyte of claim 10, wherein said polyalkylene oxide is a polyethylene oxide.

16. A cell comprising:
   (a) a first electrode;
   (b) a second electrode; and
   (c) a solid polymer electrolyte composition adhered to a major surface of said first electrode, said electrolyte composition comprising:
      (i) a solid, ionically conductive polymer comprising a polyalkylene oxide having a molecular weight greater than about 100,000;
      (ii) organically modified oxide particles comprising organic groups covalently bonded to the oxide particles; and
      (iii) an alkali metal salt;
   said electrolyte composition being essentially free of lithiated zeolite; and
   said organically modified oxide particles being essentially free of covalently bonded organic groups capable of ionically interacting with said alkali metal salt, and essentially free of covalently bonded organic groups comprising hydrogen atoms capable of forming hydrogen bonds.

17. A cell comprising:
   (a) a first electrode;
   (b) a second electrode; and
   (c) a solid polymer electrolyte composition adhered to a major surface of at least one of said electrodes,
   said electrolyte composition comprising:
      (i) a solid, ionically conductive polymer comprising a polyalkylene oxide having a molecular weight greater than about 100,000;
      (ii) organically modified oxide particles comprising organic groups covalently bonded to said oxide particles; and
      (iii) an alkali metal salt;
   said organically modified oxide particles being essentially free of covalently bonded organic groups capable of ionically interacting with said alkali metal salt, and essentially free of covalently bonded organic groups comprising hydrogen atoms capable of forming hydrogen bonds; and
   said cell being characterized by a voltage variation of no greater than about 3 mV over a period of five charge-discharge cycles, where each half cycle consists of about 1 mAh/cm$^2$ lithium being transferred through said electrolyte at a cycling rate of 0.5 mA/cm$^2$ at 80° C.

18. The cell of claim 17, wherein said first electrode comprises an electrolyte composition comprising:
   (i) a solid, ionically conductive polymer;
   (ii) organically modified oxide particles; and
   (iii) an alkali metal salt.

19. A composite electrode comprising the electrolyte composition of claim 1.

20. The electrolyte of claim 1, wherein said organic groups are selected from the group consisting of alkyl, alkyne, aryl, aldehyde, ketone, ester, tertiary amide, ether, and halogenated derivatives thereof, siloxanes, and combinations thereof.

21. A coating composition comprising:
   (a) a solid, ionically conductive polymer comprising a polyalkylene oxide having a molecular weight greater than about 100,000;
   (b) organically modified oxide particles comprising organic groups covalently bonded to said oxide particles;
   (c) an alkali metal salt, said organically modified oxide particles being essentially free of covalently bonded organic groups capable of ionically interacting with said alkali metal salt, and essentially free of covalently bonded organic groups comprising hydrogen atoms capable of forming hydrogen bonds; and
   (d) a solvent.

22. A method of preparing an electrolyte comprising:
   providing a surface;
   coating a composition onto the surface; and
   drying the coated composition to provide an electrolyte layer, wherein the coating composition comprises:
      (a) a solid, ionically conductive polymer comprising a polyalkylene oxide having a molecular weight greater than about 100,000;
      (b) organically modified oxide particles comprising organic groups covalently bonded to said oxide particles;
      (c) an alkali metal salt, said organically modified oxide particles being essentially free of covalently bonded organic groups capable of ionically interacting with said alkali metal salt, and essentially free of covalently bonded organic groups comprising hydrogen atoms capable of forming hydrogen bonds; and
      (d) a solvent.

23. The method of claim 22 further comprising irradiating the electrolyte layer.

24. A solid polymer electrolyte composition preparable by a process comprising:
   providing a surface;

coating a composition onto the surface; and drying the coated composition to provide an electrolyte layer, wherein the coating composition comprises:
  (a) a solid, ionically conductive polymer comprising a polyalkylene oxide having a molecular weight greater than about 100,000;
  (b) organically modified oxide particles comprising organic groups covalently bonded to said oxide particles;
  (c) an alkali metal salt, said organically modified oxide particles being essentially free of covalently bonded organic groups capable of ionically interacting with said alkali metal salt, and essentially free of covalently bonded organic groups comprising hydrogen atoms capable of forming hydrogen bonds; and
  (d) a solvent.

* * * * *